US00RE36384E

United States Patent [19]

Adkins et al.

[11] E Patent Number: Re. 36,384

[45] Reissued Date of Patent: Nov. 9, 1999

[54] CHEMICALLY STABLE ASCORBATE-BASED PHOTOGRAPHIC DEVELOPER AND IMAGING PROCESS

[75] Inventors: John L. Adkins, Smyrna, Ga.; Dinesh P. Patel, Edison, N.J.

[73] Assignee: Kodak Polychrome Graphics, LLC, Norwalk, Conn.

[21] Appl. No.: 08/972,071

[22] Filed: Nov. 17, 1997

Related U.S. Patent Documents

Reissue of:

[64] Patent No.: 5,589,323
Issued: Dec. 31, 1996
Appl. No.: 08/589,918
Filed: Jan. 23, 1996

[51] Int. Cl.[6] ..... G03C 5/29

[52] U.S. Cl. ..... 430/492; 430/264; 430/440; 430/446; 430/480; 430/483

[58] Field of Search ..... 430/264, 436, 430/440, 441, 446, 480, 483, 492

[56] References Cited

U.S. PATENT DOCUMENTS

| | | | |
|---|---|---|---|
| 3,022,168 | 2/1962 | Stjarnkvist et al. | 430/478 |
| 3,658,527 | 4/1972 | Kunz et al. | 430/234 |
| 4,975,354 | 12/1990 | Machonkin et al. | 430/264 |
| 5,098,819 | 3/1992 | Knapp | 430/436 |
| 5,217,842 | 6/1993 | Kojima et al. | 430/264 |
| 5,236,816 | 8/1993 | Purol et al. | 430/492 |
| 5,264,323 | 11/1993 | Purol et al. | 430/264 |
| 5,278,035 | 1/1994 | Knapp | 430/452 |
| 5,362,621 | 11/1994 | Obi et al. | 430/596 |
| 5,376,510 | 12/1994 | Parker et al. | 430/399 |
| 5,384,232 | 1/1995 | Bishop et al. | 430/440 |
| 5,464,730 | 11/1995 | Okutsu | 430/399 |
| 5,683,854 | 11/1997 | Suematsu et al. | 430/480 |

FOREIGN PATENT DOCUMENTS

| | | | |
|---|---|---|---|
| 573700 A1 | 12/1993 | European Pat. Off. | G03C 5/31 |
| 588408 A1 | 3/1994 | European Pat. Off. | G03C 5/30 |
| 632323 A1 | 1/1995 | European Pat. Off. | G03C 5/305 |
| 93/11456 | 6/1996 | WIPO | G03C 1/06 |

*Primary Examiner*—Hoa Van Le
*Attorney, Agent, or Firm*—Ratner & Prestia

[57] ABSTRACT

The invention comprises a process for forming a high contrast photographic image including the steps of imagae-wise exposing a silver halide photographic element containing a hydrazine compound which functions as a nucleating agent, wherein the element is free of incorporated amine boosters. The exposed element is developed with a chemically stable aqueous alkaline developing solution that is free of dihydroxybenzene developing agents and has a pH between 9.5 and 11. The developing solution comprises an ascorbic acid developing agent; an auxiliary developing agent; and a combination of an alkali metal carbonate and an alkali metal borate comprising between 0.125 and 0.5 molar concentration of the carbonate and between 0.04 and 0.35 molar concentration of the borate.

26 Claims, No Drawings

CHEMICALLY STABLE ASCORBATE-BASED PHOTOGRAPHIC DEVELOPER AND IMAGING PROCESS

Matter enclosed in heavy brackets [ ] appears in the original patent but forms no part of this reissue specification; matter printed in italics indicates the additions made by reissue.

FIELD OF THE INVENTION

This invention relates to developers used to produce images on exposed photographic film; to the process for producing the developers and to the process for producing an image on exposed film using the developers of the invention. The invention particularly relates to the development of environmentally benign developers which are free of conventional dihydroxybenzene developer chemicals and capable of forming a high contrast image. The invention especially relates to the use of developers based on ascorbic acid and to novel formulations to extend the chemical stability and usefulness of ascorbate-based developer solutions.

BACKGROUND OF THE INVENTION

Hydroquinone and its derivatives have been used as the preferred developer of image-wise exposed photographic film for a great many years to the point where they have been considered to be an irreducible requirement for an effective developer formulation. Their low cost and chemical properties related to redox potential, activity and long term stability during repetitive use conditions have made hydroquinone synonymous with superior silver halide developer formulation. They have been found to be useful in rapid access developer formulations for developing very high contrast films that exhibit high photographic speed and excellent dot quality. These high contrast films are made possible by including in the film certain hydrazine compounds that serve as infectious development nucleators, augmented by nucleation boosters prepared from amino compounds.

The position of hydroquinone as a preferred developer has recently come under scrutiny and disfavor as a result of a growing realization that these chemicals may present certain ecological and environmental hazards to society. These findings have triggered a surge of research among artisans in the photographic film industry to discover developers that are environmentally benign while also functioning as well as hydroquinones for the development of conventional as well as high contrast film containing nucleators. One compound that has been found to approximate the performance of dihydroxy benzene while remaining environmentally benign is ascorbic acid.

It is known that ascorbate developer pH tends to drop during use making ascorbate developer stability an obstacle to overcome in providing a stable developer that is useful for machine use when large amounts of photographic film are processed. In conventional developers based on hydroquinone the drop in pH due to processing of film is somewhat offset by the increase in pH due to aerial oxidation. Since hydroquinone has a $pK_a$ of 9.9 it is able to provide significant buffering. Since ascorbic acid has a $pK_a$ of 11.4 it does not contribute significant buffering in the useful range of developers (10.0 10.8). Ascorbate based developers decrease in pH when aerially oxidized as well as during development.

When compared to conventional dihydroxybenzene developers, ascorbate-based developers must meet and overcome other challenges in addition to overcoming problems in chemical stability. Ascorbate developers must be able to provide a high contrast product as typically produced in the art by photographic elements and/or hydroquinone developers containing high contrast promoting nucleators and amine boosters. U.S. Pat. No. 4,975,354 first described the use of "booster" technology, and U.S. Pat. No. 4,994,365 describes the use of alkyl ballasted pyridine nucleators as a method to improve image quality with the incorporated boosters. These patents are best represented by the following analog examples of Nucleators A and B and Booster I:

Nucleator A

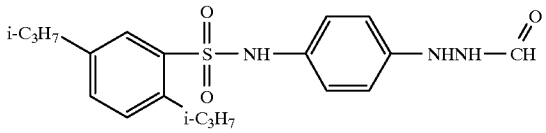

Nucleator B

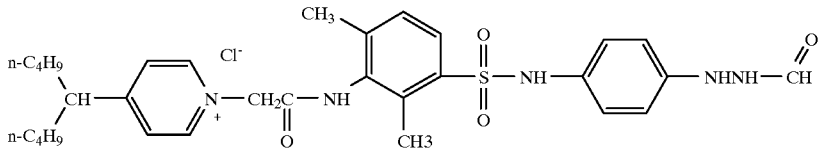

Booster I

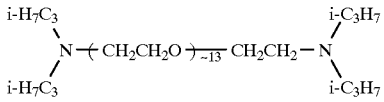

The inclusion of boosters in photographic systems, whether in the developer or in the film elements, presents a new set of problems. When in the developer, they can attack the processor equipment. The drawback of the systems which incorporated the alkanol amine boosters into the film containing the nucleators was the complexity of balancing the nucleator with the boosters to provide good discrimination at low fog or pepper levels while broadening the degree of compatibility with a number of existing rapid access developer systems. U.S. Pat. No. 5,264,323 describes the complications of balancing the hybrid systems which involves both nucleator plus booster.

U.S. Pat. No. 5,264,323 also describes an improved photographic developing solution which is free of dihydroxybenzene developing agents comprising an alkaline aqueous solution containing ascorbic acid, an auxiliary developing agent and a carbonate buffering agent in a concentration of at least 0.5 molar. The patent states that the developing solution exhibits excellent stability with respect to seasoning effects, and provides high speed and contrast combined with a low level of pepper fog and a moderate degree of chemical spread. The developer is used to develop images on an imagewise exposed photographic element or film that contains a hydrazine compound that functions as a nucleating agent and an amino compound that functions as an incorporated booster.

The objective of the present invention is to describe a process of forming a high contrast product cable of good image discrimination as evidenced by good dot production.

A second objective of the invention is to describe a process employing a hydroquinone-free developer solution to provide excellent image discrimination and high contrast, preferably in the absence of "boosters".

A third objective of the invention is to describe a hydroquinone-free developing solution capable of giving excellent results wherein the developer composition provides excellent resistance to aerial oxidation.

SUMMARY OF THE INVENTION

An effective photographic developer and a process for its utilization has been discovered that does not use dihydroxybenzene compounds such as hydroquinone. The developer and process is based on ascorbic acid and comprises a formulation that overcomes the chemical instability of ascorbate-based developers while providing high contrast for rapid access films containing nucleators without utilizing amine boosters. The ascorbic acid developer of this invention also has the added benefit of higher speed, higher gradients and higher practical density as compared to conventional hydroquinone rapid access developer when hydrazine nucleated film is processed.

Key to the discovery of the developer and method for its utilization is the use of a combination of alkali metal carbonate and alkali metal borate. These account for the superior performance in high contrast development of imagewise exposed photographic elements and the developer chemical stability over ascorbate based developers known in the art heretofore.

More particularly, the invention comprises a process for forming a high contrast photographic image including the steps of imagewise exposing a silver halide photographic element containing a hydrazine compound which functions as a nulceating agent, wherein the element is free of incorporated amine boosters. The exposed element is developed with a chemically stable aqueous alkaline developing solution that is free of dihydroxybenzene developing agents and has a pH between 9.5 and 11. The developing solution comprises an ascorbic acid developing agent; an auxiliary developing agent; and a combination of an alkali metal carbonate and an alkali metal borate comprising between 0.125 and 0.5 molar concentration of the carbonate and between 0.04 and 0.35 molar concentration of the borate.

The developer formulation of the invention has enhanced chemical stability characterized by an essentially colorless solution having a stable pH following prolonged exposure to air for at least 10 days.

The imaging process used with the developer formulation of the invention results in increased sensitivity, higher gamma, higher practical density point and better dot quality on nucleated film when compared to conventional rapid access hydroquinone developers as well as prior art ascorbic acid developers. Notable, the increased performance is realized without incorporating amine boosters in the hydrazine-containing nucleated photograhic film or element.

The developer solution is prepared by mixing in water L-ascorbic acid or D-ascorbic acid, an auxiliary developing agent selected from the group consisting of para-aminophenol, para-methylaminophenol, para-phenylenediamine, pyrazolidone, and derivatives thereo; and a combination of alkali metal carbonate and alkali metal borate.

DETAILED DESCRIPTION OF THE INVENTION

The term "an ascorbic acid developing agent", as used herein, is intended to include ascorbic acid and the analogues, isomers and derivatives thereof which function as photographic developing agents. Ascorbic acid developing agents are known in the photographic art and include, for example, the following compounds: L-ascorbic acid, D-ascorbic acid, isoascorbic acid, L-erythroascorbic acid, D-glucoascorbic acid, 6-desoxy-L-ascorbic acid, L-rhamnoascorbic acid, D-glucoheptoascorbic acid, imino-L-erythroascorbic acid, imino-D-glucoascorbic acid, imino-6-desoxy-L-ascorbic acid, imino-D-glucoheptoascorbic acid, L-glycoascorbic acid, D-galactoascorbic acid, L-araboascorbic acid, sorboascorbic acid, sodium ascorbate and the like.

Photographic systems depending on the conjoint action of hydrazine compounds which function as "nucleators" and amino compounds, whether added to the developer (as in Nothnagle, U.S. Pat. No. 4,269,929) or incorporated into the film as "boosters" (as in Machonkin et al, U.S. Pat. No. 4,912,016) are exceedingly complex. They are influenced by both the composition and concentration of the "nucleator" and the "booster" as well as variables such as the pH and composition of the developer. The discovery inherent in the present invention relates to the finding that ultra high contrast and hard dot quality can be achieved without the use of either an amine in the developer or a "booster" in the film. Since this obviates the use of an incorporated "booster" in the film, the system of the present invention is considerably simplified over the prior art.

Where conventional rapid access developers use high sulfite content and pH between about 10.4 and 10.9, hybrid developers employ a high sulfite content at a pH between about 10–12, preferably between 11.5 and 12.3. Sulfite, particularly meta or hydrogen bisulfite, can be present in the instant invention as the ammonia or alkali metal bisulfite. The sulfite preservative is used in an amount of from about 5 to about 50 grams per liter, preferably about 10 grams per liter.

Although benzotriazole and tetrazoles are commonly used antifoggants (restrainers) in both hybrid and, conventional rapid access developers, for hybrid developers it is preferred to use benzotriazole as an antifoggant in conjunction with a small amount of KBr. The developer of the instant invention also preferably employs benzotriazole as an antifoggant in conjunction with a small amount of KBr.

Various auxiliary developing agents can be used in the instant invention including, but not limited to, para-aminophenol, para-methylaminophenol (metol), para-phenylenediamine, pyrazolidone, and derivatives thereof. The auxiliary developing agent is used in an amount of from about 0.0005 to about 0.01 moles per liter, more preferably in an amount of from about 0.001 to about 0.005 moles per liter.

Any hydrazine compound that functions as a nucleator is capable of being incorporated into the photographic element to provide high contrast, and can be used in the practice of this invention (i.e., see U.S. Pat. Nos. 4,994,365, 4,998,604, 5,104,769, and 5,041,355 for examples of useful nucleators). Additional useful hydrazine nucleators are described in U.S. Pat. No. 5,439,776, incorporated herein by reference as to the composition of the nucleators; and also in U.S. Pat. No. 5,451,486, incorporated herein by reference as to the composition of the nucleators. Typically the hydrazine compound is incorporated into a silver halide emulsion used in forming the photographic element. Alternatively, the hydrazine compound may be present in a hydrophilic colloid layer of the photographic element, preferably a hydrophilic colloid layer which is coated to be contiguously adjacent to the emulsion layer in which the effects of the hydrazine compound are desired. It can, of course, be present in the photographic element distributed between or among emulsion and hydrophilic colloid layers, such as undercoating layers, interlayers and overcoating layers.

The following examples are presented to illustrate the preparation of the ascorbate developer of the invention and to compare the performance of the novel developer with other ascorbate-based developers. Photographic performance was determined by imagewise exposure of a photographic element coated with the emulsion prepared by the process described in Example 1. The photographic element is free of booster. Example 2 compares nine ascorbate-based developers (A through I). Of these developers, E through I represents non-limiting variations of the developer formulation of the present invention. Example 3 compares the ascorbate-based developer of the invention with a rapid access hydroquinone conventional developer.

Example 1

An 80:20 chloro-bromide emulsion having cubic crystals of 0.25 micron size was prepared by an ammoniacal method using a balanced double jet precipitation of one mole of 1.2 Normal silver nitrate, and a 1.55 mole mixture of potassium bromide-ammonium chloride with 2.2 grams per mole of ethylenediamine and 335 nanomole per mole of sodium hexachlororhodate, into a 3.6 weight percent gel solution at pH 8 over a 15 minute period at 35 degrees C. The soluble by-product salts were removed by washing after coagulating the emulsion with an aromatic sulfonate at low pH. The emulsion was then redispersed to a 10 percent silver analysis with 55 grams per mole of gelatin, and was digested at 50 degrees C. for 42 minutes at pH 6 in the presence of 0.05 mole iodide, 7 mg sodium benzenethiosulfinate, 11 micromoles sodium tetrachloaurate, and 31 micromoles sodium thiosulfate. The emulsion was stabilized with 4500 micromoles of 4-hydroxy-6-methyl-1,3,3a,7-tetraazaindene, spectrally sensitized with 5-[(3-ethyl-2-thiazolidine)-ethylidene]-4-oxo-2-thioxo-3-thiazolidine acetic acid, sodium dioctylsulfosuccinate was added as a coating aid at 0.7 grams per mole of silver, a latex for dimensional stability, and Nucleator 1, structurally depicted herein after in Example 5, was added as methanol a solution at the level of $8.5\times10^{-4}$ mole of nucleator per mole of silver. The emulsions were then coated onto a polyester base at 40 mg silver per square decimeter, and were overcoated with an aqueous gelatin anti-abrasion layer containing dimethylolurea as a hardening agent. The dried film samples were exposed using a tungsten point source.

Synthesis of Nucleator 1 and Nucleator 2

The synthesis of 2-chloro-N-[3-[[[4-(2-formylhydrazino) phenyl]amino]sulfonyl]-2, 6-dimethylphenyl]-acetamide (i.e. Intermediate A) was carried out as described in U.S. Pat. Nos. 4,030,925 and 4,994,365. Nucleator 1 was prepared by heating a mixture of 50 grams (0.122 mole of Intermediate A and 62.5 grams (0.311 moles) of 5-(4-pyridyl)-2, 7-nonadiene in 100 milliliters of N, N-dimethylacetamide for 1.5 hours on a steambath. It was purified by diluting with methanol and reprecipitating with an excess of isopropyl ether. Yield: 67.3 grams (89%), MP 270 C. with bubbling at 260 C. Analysis: Calculated for $C_{31}H_{38}ClN_5O_4S$; C, 60.82; H,6.26; N, 11.44; Cl, 5.79; S, 5.24. Found: C, 60.50; H, 6.38; N, 11.20; Cl, 5.98; S, 5.26. Nucleator 2 is Compound I-43 on page 20 of Japanese Kokai 5-204075 (Aug. 13, 1993).

The following chemical stability tests were performed on developers A–I:

pH and color observations pH and color observations were carried out in open beakers and in closed bottles as prepared fresh, after 5 days and after 10 days;

pH buffering titration tests pH buffering titration tests were carried out on A through I fresh solutions. 25 cc of each developer was diluted with 25 cc of water and titrated with 0.5N hydrochloric acid. The results are presented in Table 6.

Example 2

Ascorbate Developer Variations A–I

Ascorbic acid developer variations A through I were prepared using different amounts of sodium metaborate octahydrate and/or potassium carbonate, anhydrous. All other components were the same grams/liter concentration, except slight variations in potassium hydroxide, which were necessary to adjust all to the same pH of 10.35. The composition of the developers are reported in Table 1.

A, B, C and D are comparisons developers, while E through I represent the invention. Results from the pH and color tests are reported in Table 2. These data show that the use of a combination of both carbonate and borate (E–I) gives better chemical stability in terms of less color change toward yellow, less pH drop with aerial oxidation, and more buffering capacity. When carbonate is used alone, the initial color is yellow and increases greatly in intensity upon aerial oxidation to a final orange color, whereas all variations containing borate were initially colorless (water white clear) and a slight tendency for increasing color upon aerial oxidation was only evident when low levels of borate were used, as in E and F.

After 10 days in an open beaker, only one of the four comparisons (B) still had a minimally useful pH of 10.08, whereas all invention variations (E, F, G, H and I) had useful pH's of 10.05, 10.08, 10.19, 10.21 and 10,26, respectively. Although comparison B with a high level of carbonate similar to levels used in U.S. Pat. No. 5,264,323 was resistant to a drop in pH, the yellow-orange color formation indicated excessive oxidation had taken place.

The pH buffering titration tests show that overall increased buffering capacity can be achieved with the use of both carbonate and borate together. The results for the titration tests for developers A–I are presented in Table 6. The results show that developers G, H and I are superior to Developer B.

Sensitometric Results

Sensitometric tests were carried out on image-wise exposed film containing nucleator 1 developed using developers A–I. Sensitometric results are tabulated in Tables 3 for both the comparison developers and the developers of the invention. A–I were manually photo-tested in a slit tank at 100° F., 30" development time. Invention variations E–I, and especially the higher levels of borate in F–I, showed higher contrast gradients G1, G2 and G3. These much higher straight line and shoulder gradients will ultimately give more practical camera Dmax when used with a high volume of film on an ongoing running processor basis. The higher contrasts are also important to ensure hard dot quality in screen images.

Example 3

Ascorbate Developer Vs Hydroquinone Rapid Access Developer

An ascorbic acid developer of this invention and a conventional hydroquinone developer were prepared. The ascorbic acid developer was adjusted to a pH of 10.35 while the hydroquinone developer was adjusted to 10.55. The compositions of the developers are reported in Table 4. Some erythrobate is included in the hydroquinone developer, serving primarily as an anti-oxidant for the hydroquinone and not as a developing agent at this low level.

Sensitometric tests were carried out on image wise exposed film containing nucleator as well an non-nucleated film.

Sensitometric results are tabulated in Table 5 for a comparison between ascorbic acid developer and hydroquinone developer. Both developers were photo-tested in Polychrome PQ-17 automatic processors with coating 1 (no Nucleator), coating 2 (with Nucleator 1), and coating 3 (with Nucleator 2). Processor conditions were 30" development at 100° F.

As indicated in the data in Table 5, with coating 1, a non-nucleated film, the same speed and similar PDP values are obtained with both ascorbic acid and hydroquinone developers. With the nucleated films, faster speed, higher gradients, higher PDP, and better dot quality are achieved with the ascorbic acid developer.

TABLE 1

COMPOSITION OF DEVELOPERS FOR EXAMPLE 2

| | Developers | | | | | | | | |
|---|---|---|---|---|---|---|---|---|---|
| Raw Materials | A g/L | B g/L | C g/L | D g/L | E g/L | F g/L | G g/L | H g/L | I g/L |
| Sodium Sulfite | 16 | 16 | 16 | 16 | 16 | 16 | 16 | 16 | 16 |
| L. Ascorbic Acid | 37 | 37 | 37 | 37 | 37 | 37 | 37 | 37 | 37 |
| Dimezone "S" | 2.5 | 2.5 | 2.5 | 2.5 | 2.5 | 2.5 | 2.5 | 2.5 | 2.5 |
| Potassium Carbonate Anh. | 66 | 103.5 | *** | *** | 66 | 66 | 66 | 66 | 66 |
| Sodium Metaborate-8 $H_2O$ | *** | *** | 35 | 85 | 15 | 25 | 35 | 45 | 72 |
| Potassium Bromide | 7 | 7 | 7 | 7 | 7 | 7 | 7 | 7 | 7 |
| Benzotriazole | 0.5 | 0.5 | 0.5 | 0.5 | 0.5 | 0.5 | 0.5 | 0.5 | 0.5 |
| 2-Mercapto Benzothiazole | 0.038 | 0.038 | 0.038 | 0.038 | 0.038 | 0.038 | 0.038 | 0.038 | 0.038 |
| 50% Potassium Hydroxide | 11.5 | 7.8 | 19 | 12.5 | 12 | 11.2 | 10.8 | 10.55 | 9.5 |
| Water to make 1 liter | 1 L. | 1 L. | 1 L. | 1 L. | 1 L. | 1 L. | 1 L. | 1 L. | 1 L. |

TABLE 2

PROPERTIES OF DEVELOPERS* FOR EXAMPLE 2

| | Developers | | | | | | | | |
|---|---|---|---|---|---|---|---|---|---|
| | A | B | C | D | E | F | G | H | I |
| pH | 10.35 | 10.35 | 10.35 | 10.35 | 10.35 | 10.35 | 10.35 | 10.35 | 10.35 |
| Fresh made initial color | vly | y | cl | cl | cl | cl | cl | cl | cl |
| Closed bottle 5 day-pH | 10.25 | 10.34 | 10.24 | 10.30 | 10.34 | 10.34 | 10.34 | 10.35 | 10.35 |
| Closed bottle 5 day color | ly | y | cl | cl | cl | cl | cl | cl | cl |
| Closed bottle 10 day-pH | 10.20 | 10.33 | 10.14 | 10.30 | 10.34 | 10.34 | 10.35 | 10.35 | 10.35 |
| Closed bottle 10 day color | ly | ly | cl | cl | cl | cl | cl | cl | cl |
| Open beaker 5 day-pH | 10.01 | 10.12 | 9.90 | 10.03 | 10.10 | 10.12 | 10.23 | 10.24 | 10.28 |
| Open beaker 5 day color | lo | o | cl | cl | vly | vly | cl | cl | cl |
| Open beaker 10 day-pH | 9.95 | 10.08 | 9.72 | 9.96 | 10.05 | 10.08 | 10.19 | 10.21 | 10.26 |
| Open beaker 10 day color | lo | o | cl | cl | vly | vly | cl | cl | cl |
| Tot. moles carbonate + borate or carbonate or borate from Table 1. | 0.48 | 0.75 | 0.13 | 0.31 | 0.53 | 0.57 | 0.61 | 0.64 | 0.74 |

*vly = very light yellow
ly = light yellow
y = yellow
cl = colorless
lo = light orange
o = orange

TABLE 3

SENSITOMETRIC TEST RESULTS ON DEVELOPERS A TO I FOR EXAMPLE 2 APPLIED TO EXPOSED FILM CONTAINING NUCLEATOR I

| | Speeds | | | Gradients | | | | | |
|---|---|---|---|---|---|---|---|---|---|
| Developer | S1 (0.5 D) | S2 (4.0 D) | S3 (3.0 D) | G1 (0.1–0.5) | G2 (0.5–3) | G3 (3–4) | Dmin | Dmax | Dot* |
| A | 268 | 206 | 227 | 12.06 | 35.15 | 23.16 | 0.03 | 6.0+ | 4 |
| B | 283 | 209 | 247 | 11.25 | 41.88 | 33.81 | 0.03 | 6.0+ | 5 |
| C | 229 | 69 | 89 | 9.84 | 6.08 | 8.95 | 0.03 | 5.0+ | 2 |
| D | 264 | 82 | 172 | 9.0 | 13.39 | 3.08 | 0.03 | 5.0+ | 3 |
| E | 274 | 221 | 235 | 12.06 | 37.86 | 37.50 | 0.03 | 5.0+ | 4 |
| F | 281 | 227 | 237 | 11.67 | 33.36 | 52.49 | 0.03 | 5.0+ | 4 |
| G | 303 | 257 | 264 | 11.67 | 41.1 | 87.49 | 0.03 | 5.0+ | 5 |
| H | 306 | 253 | 264 | 13.69 | 39.37 | 52.49 | 0.03 | 5.0+ | 5 |
| I | 284 | 219 | 240 | 11.67 | 33.94 | 24.61 | 0.03 | 5.0+ | 5 |

Development time = 30 seconds
Temperature = 100° F.;
*Dot quality is expressed on a scale of 1 to 5 with 5 being best.
Speeds are expressed arithmetically as the anti-log of the relative log exposure at the indicted density point.
Gradients are calculated from the density points listed.

TABLE 4

L-ASCORBIC ACID DEVELOPER VS. RAPID ACCESS DEVELOPER COMPOSITION FOR EXAMPLE 3

| Raw Material | L. Ascorbic Acid Developer (g/l) | Rapid Access Developer (g/l) |
|---|---|---|
| DI water | to make 1 liter | to make 1 liter |
| L. Ascorbic acid | 37 | — |
| 45% Potassium hydroxide | — | 40 |
| Sodium sulfite | 16 | — |
| Potassium metabisulfite | — | 34 |
| 41% DTPA | 3 | 3 |
| Dimezone-"S" | 2.5 | 0.55 |
| Potassium carbonate anhydrous | 66 | 15.5 |
| Sodium meta borate-8 $H_2O$ | 28 | — |
| Potassium bromide | 7 | 3.75 |

TABLE 4-continued

L-ASCORBIC ACID DEVELOPER VS. RAPID ACCESS DEVELOPER COMPOSITION FOR EXAMPLE 3

| Raw Material | L. Ascorbic Acid Developer (g/l) | Rapid Access Developer (g/l) |
|---|---|---|
| Hydroquinone | — | 16 |
| Sodium erythorbate | — | 1 |
| Benzotriazole | 0.6 | 0.15 |
| PMT | — | 0.025 |
| 2-Mercapto benzothiazole | 0.04 | 0.03 |
| 50% Sodium hydroxide | 9.18 | — |
| Diethylene glycol | — | 15 |
| Normal pH | 10.35 | 10.55 |
| Normal color | colorless | colorless |

TABLE 5

SENSITOMETRIC RESULTS OF L. ASCORBIC ACID DEVELOPER VS HYDROQUINONE RAPID ACCESS DEVELOPER FOR EXAMPLE 3

| Film coating No. | Developer[1] | B + F | S1 speed at 0.5 density | Dmax at Practical density Point (PDP) | G1 | G2 | Dot Quality |
|---|---|---|---|---|---|---|---|
| 1 | AA | 0.05 | 0.19 | 4.96 | | | |
| 1 | HQRA | 0.05 | 0.19 | 5.15 | | | |
| 2 | AA | 0.03 | 0.58 | 5.35 | 9.5 | 22.6 | 5 |
| 2 | HQRA | 0.03 | 0.71 | 3.97 | 7.9 | 11.7 | +4 |
| 3 | AA | 0.03 | 0.6 | 5.24 | 11.3 | 23.4 | 5 |
| 3 | HQRA | 0.03 | 0.74 | 4.38 | 7.7 | 13.3 | +4 |

PDP is the density at log relative exposure for 0.5 density + 0.4
S1 is the required delta log relative exposure to obtain 0.5 density.
Straight line gradients C2 were measured between the log exposure values at density 0.5 and 3.0 above fog, while toe gradients G1 were between 0.1 and 0.5.
[1]- AA = Ascorbic Acid
HQRA = Hydroquinone Rapid Access

TABLE 6

| | 0.5N HCl (cc) Developer pH - Titration Data | | | | | | | | |
|---|---|---|---|---|---|---|---|---|---|
| | A | B | C | D | E | F | G | H | I |
| 0.00 | 10.41 | 10.39 | 10.21 | 10.22 | 10.40 | 10.39 | 10.40 | 10.40 | 10.39 |
| 4.00 | 10.10 | 10.15 | 9.68 | 9.76 | 10.11 | 10.12 | 10.16 | 10.18 | 10.19 |
| 8.00 | 9.78 | 9.94 | 9.29 | 9.37 | 9.84 | | 9.96 | 10.00 | 10.05 |
| 12.00 | 9.45 | 9.76 | 9.00 | 9.04 | 9.55 | 9.60 | 9.75 | 9.81 | 9.95 |
| 16.00 | 8.98 | 9.56 | 8.61 | 8.71 | 9.24 | 9.28 | 9.50 | 9.60 | 9.72 |
| 20.00 | 8.20 | 9.30 | 8.19 | 8.24 | 8.78 | 8.94 | 9.38 | 9.39 | 9.42 |
| 24.00 | 7.60 | 8.96 | 7.62 | 7.76 | 7.88 | 8.42 | 9.00 | 9.02 | 9.08 |
| 28.00 | 6.68 | 8.20 | 6.90 | 7.00 | 7.15 | 7.55 | 8.22 | 8.26 | 8.80 |
| 32.00 | 6.42 | 7.38 | 5.99 | 6.08 | 6.76 | 7.00 | 7.36 | 7.40 | 8.62 |
| 32.00 | 6.22 | 6.96 | 4.60 | 4.72 | 6.52 | 6.68 | 6.98 | 7.02 | 8.38 |
| 40.00 | 6.00 | 6.76 | 3.73 | 3.98 | 6.34 | 6.50 | 6.80 | 6.82 | 7.94 |
| 43.50 | | | 2.50 | | | | | | |
| 44.00 | 5.68 | 6.58 | | 2.96 | 6.12 | 6.28 | | 6.68 | 7.67 |
| 46.00 | | | | 2.50 | | | | | |
| 48.00 | 5.10 | 6.52 | | | 5.84 | 6.10 | 6.58 | 6.50 | 6.86 |
| 52.00 | 4.28 | 6.40 | | | 5.30 | 5.76 | 6.40 | 6.45 | 6.55 |
| 55.00 | 3.80 | 6.26 | | | 4.48 | 5.22 | 6.25 | 6.30 | 6.42 |
| 60.00 | 3.10 | 6.10 | | | 3.95 | 4.30 | 6.08 | 6.12 | 6.26 |
| 62.00 | 2.50 | | | | | | | | |
| 64.00 | | 5.88 | | | 2.86 | 3.86 | 5.86 | 5.92 | 6.10 |
| 66.00 | | | | | 2.50 | | | | |
| 68.00 | | 5.56 | | | | 2.78 | 5.53 | 5.58 | 5.80 |
| 69.00 | | | | | | 2.50 | | | |
| 72.00 | | 4.98 | | | | | 4.94 | 5.02 | 5.32 |
| 76.00 | | 4.25 | | | | | 4.22 | 4.38 | 4.42 |
| 80.00 | | 3.56 | | | | | 3.53 | 3.92 | 3.80 |
| 83.50 | | 2.50 | | | | | 2.50 | | |
| 84.00 | | | | | | | | 2.73 | 2.94 |
| 85.50 | | | | | | | | 2.50 | |
| 88.00 | | | | | | | | | 2.50 |
| 92.00 | | | | | | | | | |

Example 4

A series of experients, reported here as Example 4, was conducted to define the useful and the preferred range of the ingredients of the developer of the invention, particularly with repect to the useful and preferred ranges of the combination of alkali metal carbonate and alkali metal borate in the developer. The upper level of borate in this example was set at 0.16 molar, since this is all that will remain in solution in a one part concentrate that is intended to be diluted with three parts of water, as is comonly done in commercial use. As in the previous examples, performance was determined by testing pH and color stability as described herein before. Also as described herein before sensitometric data was collected for each of the twenty-five variations of the developer composition. The photographic element employed for image wise exposure was that described in Example 1. The results of Example 4 are depicted in Tables 7 and 8. Color in Table 7 is rated on a scale of 1 to 5, with 5=Excellent, and 1=Poor. Dot Quality in Table 8 is rated on a scale of 1 to 5, with 5=Excellent, and 1=Poor.

The formulation of the developers used in Example 4 to assess the useful range of ingredients in the developer of the invention is depicted in Table 9 along with a compliation of the amounts of ingredients used for samples A through Y of Tables 7 and 8. Table 9 also lists the useful ranges of each ingredient, inparticular the useful ranges of alkali metal carbonate and alkali metal borate.

TABLE 7

| | Potassium Carbonate | Sodium m-Borate | pH in Open Beaker | | | | pH Sealed | Color, In Open Beaker | | | | Color Sealed |
|---|---|---|---|---|---|---|---|---|---|---|---|---|
| Sample | Molarity | Molarity | Fresh | 1 Day | 3 Days | 7 Days | 7 Days | Fresh | 1 Day | 3 Days | 7 Days | 7 Days |
| A | 0 | 0 | 10.75 | 10.18 | 9.54 | 8.93 | 10.30 | 5 | 4 | 3 | 1 | 2 |
| B | 0.125 | 0 | " | 10.35 | 9.88 | 9.43 | 10.35 | 5 | 4 | 3 | 2 | 2 |
| C | 0.25 | 0 | " | 10.44 | 10.10 | 9.73 | 10.41 | 4 | 4 | 3 | 1 | 1 |
| D | 0.375 | 0 | " | 10.52 | 10.20 | 9.89 | 10.45 | 4 | 4 | 3 | 1 | 1 |
| E | 0.5 | 0 | " | 10.56 | 10.28 | 9.98 | 10.54 | 4 | 4 | 3 | 1 | 2 |
| F | 0 | 0.04 | " | 10.14 | 9.75 | 9.21 | 9.47 | 5 | 5 | 5 | 3 | 4 |
| G | 0.125 | 0.04 | " | 10.35 | 10.15 | 9.64 | 10.42 | 5 | 4 | 4 | 3 | 4 |
| H | 0.25 | 0.04 | " | 10.45 | 10.26 | 9.86 | 10.47 | 5 | 4 | 2 | 3 | 4 |
| I | 0.375 | 0.04 | " | 10.50 | 10.31 | 10.00 | 10.54 | 5 | 2 | 2 | 3 | 4 |
| J | 0.5 | 0.04 | " | 10.55 | 10.39 | 10.16 | 10.60 | 5 | 2 | 2 | 1 | 4 |
| K | 0 | 0.08 | " | 10.26 | 9.85 | 9.40 | 10.16 | 5 | 5 | 5 | 4 | 4 |
| L | 0.125 | 0.08 | " | 10.44 | 10.19 | 9.80 | 10.52 | 5 | 5 | 4 | 4 | 4 |
| M | 0.25 | 0.08 | " | 10.54 | 10.30 | 10.11 | 10.58 | 5 | 5 | 4 | 4 | 4 |
| N | 0.375 | 0.08 | " | 10.58 | 10.38 | 10.19 | 10.62 | 5 | 5 | 4 | 4 | 4 |
| O | 0.5 | 0.08 | " | 10.64 | 10.46 | 10.22 | 10.67 | 5 | 5 | 4 | 4 | 4 |
| P | 0 | 0.12 | " | 10.32 | 9.96 | 9.48 | 10.39 | 5 | 5 | 5 | 5 | 5 |
| Q | 0.125 | 0.12 | " | 10.46 | 10.24 | 10.10 | 10.54 | 5 | 5 | 5 | 4 | 5 |
| R | 0.25 | 0.12 | " | 10.54 | 10.36 | 10.17 | 10.65 | 5 | 5 | 5 | 4 | 5 |
| S | 0.375 | 0.12 | " | 10.59 | 10.45 | 10.21 | 10.68 | 5 | 5 | 5 | 4 | 4 |
| T | 0.5 | 0.12 | " | 10.64 | 10.53 | 10.26 | 10.71 | 5 | 5 | 5 | 4 | 4 |
| U | 0 | 0.16 | " | 10.36 | 10.25 | 9.61 | 10.49 | 5 | 5 | 5 | 5 | 5 |
| V | 0.125 | 0.16 | " | 10.46 | 10.34 | 10.12 | 10.61 | 5 | 5 | 5 | 5 | 5 |
| W | 0.25 | 0.16 | " | 10.55 | 10.43 | 10.22 | 10.65 | 5 | 5 | 5 | 5 | 5 |
| X | 0.375 | 0.16 | " | 10.59 | 10.51 | 10.24 | 10.66 | 5 | 5 | 5 | 5 | 5 |
| Y | 0.5 | 0.16 | " | 10.65 | 10.58 | 10.29 | 10.72 | 5 | 5 | 5 | 5 | 5 |

TABLE 8

| Sample | Potassium Carbonate Molarity | Sodium m-Borate Molarity | Performance Data S (0.5 D) | G (0.5–4.0 D) | Dmax | Dot Quality |
|---|---|---|---|---|---|---|
| A | 0 | 0 | 193 | 8.5 | 5.2 | 2 |
| B | 0.125 | 0 | 270 | 7.0 | 5.3 | 3 |
| C | 0.25 | 0 | 315 | 11.2 | 5.4 | 3 |
| D | 0.375 | 0 | 322 | 15.7 | 5.5 | 4 |
| E | 0.5 | 0 | 311 | 23.0 | 5.5 | 4 |
| F | 0 | 0.04 | 255 | 6.7 | 5.4 | 2 |
| G | 0.125 | 0.04 | 303 | 9.1 | 5.5 | 4 |
| H | 0.25 | 0.04 | 323 | 21.8 | 5.6 | 4 |
| I | 0.375 | 0.04 | 333 | 28.5 | 5.6 | 5 |
| J | 0.5 | 0.04 | 344 | 29.2 | 5.6 | 5 |
| K | 0 | 0.08 | 246 | 6.9 | 5.3 | 3 |
| L | 0.125 | 0.08 | 305 | 8.8 | 5.3 | 4 |
| M | 0.25 | 0.08 | 315 | 21.1 | 5.3 | 4 |
| N | 0.375 | 0.08 | 331 | 23.2 | 5.3 | 5 |
| O | 0.5 | 0.08 | 349 | 30.1 | 5.3 | 5 |
| P | 0 | 0.12 | 264 | 6.4 | 5.3 | 3 |
| Q | 0.125 | 0.12 | 311 | 9.3 | 5.3 | 4 |
| R | 0.25 | 0.12 | 332 | 19.2 | 5.2 | 4 |
| S | 0.375 | 0.12 | 331 | 25.1 | 5.2 | 5 |
| T | 0.5 | 0.12 | 346 | 28.6 | 5.2 | 5 |
| U | 0 | 0.16 | 277 | 6.7 | 5.2 | 3 |
| V | 0.125 | 0.16 | 316 | 9.3 | 5.2 | 4 |
| W | 0.25 | 0.16 | 334 | 22.4 | 5.0 | 4 |
| X | 0.375 | 0.16 | 353 | 22.6 | 5.0 | 5 |
| Y | 0.5 | 0.16 | 359 | 23.8 | 5.0 | 5 |

TABLE 9

Formulation of Developer Samples A–Y

| Ingredient | Amount Used for Developer Samples A–Y (g/L) | Useful Range of Ingredients (g/l)* |
|---|---|---|
| Versenol 120 | 4 | 1 to 15 |
| Sodium Sulfite | 10 | 5 to 50 |
| L-Ascorbic Acid | 37 | 5 to 50 |
| Dimezone-S | 0.9 | 0.1 to 5 |
| Sodium Metaborate-8 Hydrate | 0.0, 8.4, 16.8, 25.2, 33.6 (a) | 0.025 to 0.16 mole/liter |
| Potassium Carbonate, Anhy | 0.0, 17.25, 34.5, 51.75, 69 (b) | 0.1 to 0.5 mole/liter |
| potassium Bromide | 8 | 1 to 15 |
| Diethanolamine, 85% | 10 | 5 to 50 |
| Diethylene Glycol-600 | 0.25 | 0.1 to 10 |
| Benzotriazole | 0.19 | 0.05 to 5 |
| PMT | 0.083 | 0.01 to 0.2 |
| 2-mercaptobenzothiazole | 0.04 | 0.01 to 1 |
| Potassium Hydroxide, 45% | to pH 10.75 | 10.0 to 11.5 |
| Water | to 1 liter | — |

(a) This corresponds to 0.04, 0.08, 0.12 and 0.16 molar
(b) This corresponds to 0, 0.125, 0.250, 0.375, and 0.50 molar
*The upper level of borate was set at 0.16 molar; this is all that will remain in solution in a one part concentrate that is intended to be diluted with three parts of water.

TABLE 10

Developer Performance Data for Exposed Photographic Elements Containing Various Nucleators

| Nucleator | S (0.5 D) | 4S | G (0.5–4 D) | Dmin | Dmax | Dot Quality |
|---|---|---|---|---|---|---|
| Camera Film | | | | | | |
| None | 244 | 60 | 5.7 | 0.04 | 5.32 | 1 |
| nucleator 1 | 309 | 223 | 24.7 | 0.04 | 5.42 | 5 |
| nucleator 2 | 235 | 168 | 24.0 | 0.04 | 5.45 | 5 |
| nucleator 5 | 224 | 148 | 19.4 | 0.04 | 5.38 | 5 |
| nucleator 4 | 330 | 195 | 15.3 | 0.04 | 5.41 | 5 |
| nucleator 5 | 245 | 148 | 16.0 | 0.04 | 5.48 | 5 |
| Kodak CGP film(4) | 389 | 222 | 14.4 | 0.04 | 5 | 4 |
| Scanner Film | | | | | | |
| None | 239 | 75 | 7.0 | 0.04 | 5.34 | 1 |
| nucleator 1 | 207 | 119 | 14.6 | 0.03 | 5.68 | 5 |
| nucleator 3 | 219 | 134 | 16.4 | 0.03 | 5.64 | 5 |
| Kodak SAI Film(4) | 152 | 87 | 14.4 | 0.04 | 5.35 | 5 |

Notes to Table 10.

1. Camera films were exposed using a conventional tungsten bulb for approximately 15 seconds.

2. Scanner films were exposed using an EG&G flash exposure at 10–5 seconds.

3. Nucleators tested are known in the art, see structures. Nucleator 2 is compound I-6 in U.S. Pat. No. 4,994,365.

4. This film is sold commercially as having an incorporated booster and nucleator.

Example 5

A series of experiments was carried out to compare the sensitometric performance of the developer of the invention on imagewise exposed camera film and scanner film that incorporate different nucleators. The nucleators tested were Nucleator 1 and Nucleator 3 taught in U.S. Pat. No. 5,451,486, Nucleator 4 and Nucleator 5 taught in U.S. Pat. No. 5,439,776; Nucleator 6 taught in JP05204075 and a commercial Kodak CGP and SAI films containing nucleator and booster technology. Except for the commercial film, the tested nucleator film was prepared using an emulsion prepared according to the process described in Example 1. One each of the camera and scanner test film contained no nucleator. The results of Example 5 are presented in Table 10.

The chemical structures of the nucleators tested in Example 5 and found in the cited patents are depicted as follows

NUCLEATOR 1

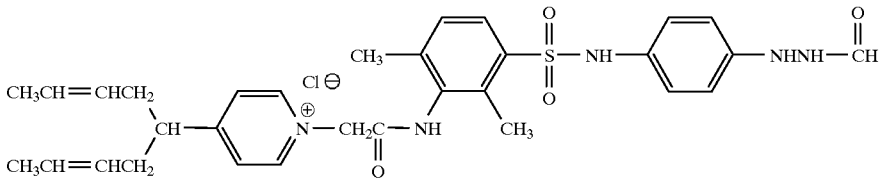

NUCLETOR 3

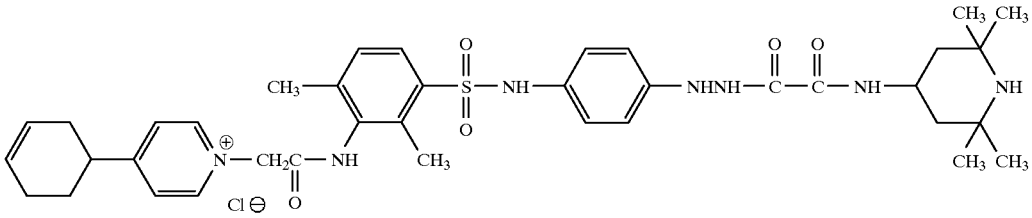

NUCLEATOR 4

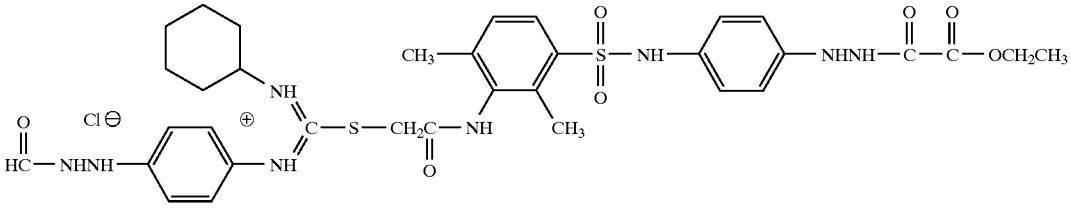

NUCLEATOR 5

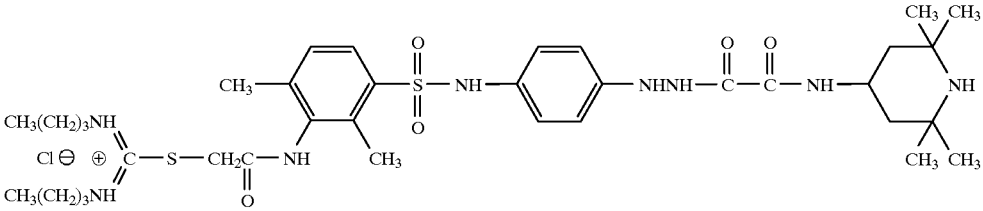

NUCLEATOR 6

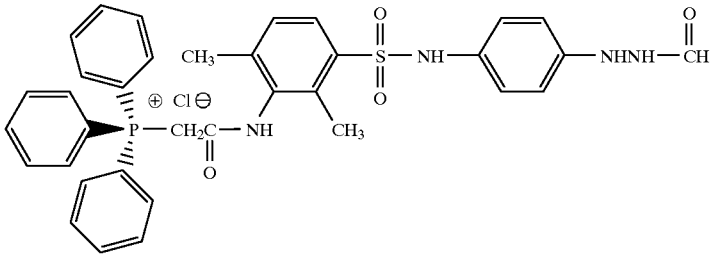

What is claimed is:

1. A process for forming a high contrast photographic image comprising the steps of:

a) imagewise exposing a silver halide photographic element containing a hydrazine compound which functions as a nucleating agent, wherein said element is free of incorporated amine boosters; and b) developing said exposed element with a chemically stable aqueous alkaline developing solution that is free of dihydroxybenzene developing agents and has a pH between 9.5 and 11, said developing solution comprising:

i. an ascorbic acid developing agent;

ii. an auxiliary developing agent; and iii. a combination of an alkali metal carbonate and an alkali metal borate comprising between 0.125 and 0.5 molar concentration of said carbonate and between 0.04 and 0.35 molar concentration of said borate.

2. The process of claim 1 wherein said combination of an alkali metal carbonate and an alkali metal borate comprises between 0.125 and 0.375 molar concentration of said carbonate and between 0.04 and 0.16 molar concentration of said borate.

3. The process of claim 1 wherein said combination of an alkali metal carbonate and an alkali metal borate comprises 0.30 molar concentration of said carbonate and 0.08 molar concentration of said borate.

4. The process of claim 1 wherein said ascorbic acid developing agent comprises L-ascorbic acid or D-ascorbic acid or isoascorbic acid.

5. The process of claim 1 wherein said auxiliary developing agent is selected from the group consisting of para-aminophenol, para-methylaminophenol, para-phenylenediamine, pyrazolidone, and derivatives thereof.

6. The process of claim 1 wherein said alkali metal carbonate comprises anhydrous potassium carbonate and said alkali metal borate comprises sodium metaborate octahydrate.

7. The process of claim 1 additionally containing a benzotriazole antifoggant, an alkali metal sulfite and an alkali metal hydroxide.

8. The process of claim 7 including the step of introducing said alkali metal hydroxide to provide said pH is between 10.0 and 11.0.

9. The process of claim 1 wherein said chemically stable aqueous alkaline developing solution exhibits pH and color stability for at least seven days in an open beaker color/pH stability test.

10. The process of claim 1 wherein the developed exposed element exhibits a Dmax of at least 5.0.

11. The process of claim 1 wherein said hydrazine comprises an aryl sulfonamidophenyl hydrazide.

12. The process of claim 1 wherein said developing solution contains between 5 and 50 grams per liter of said ascorbic acid developing agent and between 0.1 and 5 grams per liter of said auxiliary developing agent.

*13. A process for forming a high contrast photographic image comprising the steps of:*

(*a*) *imagewise exposing a silver halide photographic element; and*

(*b*) *developing said exposed element with a chemically stable aqueous alkaline developing solution that is free of dihydrobenzene developing agents and has a pH between 9.5 and 11, said developing solution comprising:*

*i. an ascorbic acid developing agent;*

*ii. an auxiliary developing agent; and*

*iii. a combination of an alkali metal carbonate and an alkali metal borate comprising between 0.125 and 0.5 molar concentration of said carbonate and between 0.04 and 0.35 molar concentration of said borate.*

*14. The process of claim 13 wherein the combination of an alkali metal carbonate and an alkali metal borate comprises between 0.125 and 0.375 molar concentration of said carbonate and between 0.04 and 0.16 molar concentration of said borate.*

*15. The process of claim 13 wherein the combination of an alkali metal carbonate and an alkali metal borate comprises 0.30 molar concentration of said carbonate and 0.08 molar concentration of said borate.*

*16. The process of claim 13 wherein said ascorbic acid developing agent comprises L-ascorbic acid or D-ascorbic acid or isoascorbic acid.*

*17. The process of claim 13 wherein said auxiliary developing agent is selected from the group consisting of para-aminophenol, para-methylaminophenol, para-phenylenediamine, pyrazolidone, and derivatives thereof.*

*18. The process of claim 1 wherein said alkali metal carbonate comprises an anhydrous potassium carbonate and said alkali metal borate comprises sodium metaborate octahydrate.*

*19. The process of claim 13 additionally containing a benzotriazole antifoggant, an alkali metal sulfite and an alkali metal hydroxide.*

*20. The process of claim 17 including the step of introducing said alkali metal hydroxide to provide said pH is between 10.0 and 11.0.*

*21. The process of claim 13 wherein said chemically stable aqueous alkaline developing solution exhibits pH and color stability for at least seven days in an open beaker color/pH stability test.*

*22. The process of claim 13 wherein the developed exposed element exhibits a Dmax of at least 5.0.*

*23. The process of claim 1 wherein said hydrazine comprises an aryl sulphonamidophenyl hydrazide.*

*24. The process of claim 1 wherein said developing solution contains between 5 and 50 grams per liter of said ascorbic acid developing agent and between 0.1 and 5 grams per liter of said auxiliary developing agent.*

*25. A chemically stable aqueous alkaline developing solution that is free of dihydrobenzene developing agents and has a pH between 9.5 and 11, said developing solution comprising:*

*i. an ascorbic acid developing agent;*

*ii. an auxiliary developing agent; and*

*iii. a combination of an alkali metal carbonate and an alkali metal borate comprising between 0.125 and 0.5 molar concentration of said carbonate and between 0.04 and 0.35 molar concentration of said borate.*

*26. The developing solution according to claim 25 wherein the solution contains between 5 and 50 grams per liter of said ascorbic acid developing agent and between 0.1 and 5 grams per liter of said auxiliary developing agent.*

* * * * *